(12) United States Patent
Renno (10) Patent No.: US 11,173,747 B2
(45) Date of Patent: Nov. 16, 2021

(54) BRAKING AND LOCKING SYSTEM FOR CASTER WHEELS

(71) Applicant: KIDS II, INC., Atlanta, GA (US)

(72) Inventor: Shadi Renno, Sandy Springs, GA (US)

(73) Assignee: KIDS2, INC., Atlanta, GA (US)

( * ) Notice: Subject to any disclaimer, the term of this patent is extended or adjusted under 35 U.S.C. 154(b) by 547 days.

(21) Appl. No.: 15/968,151

(22) Filed: May 1, 2018

(65) Prior Publication Data

US 2018/0319214 A1 Nov. 8, 2018

Related U.S. Application Data

(60) Provisional application No. 62/501,166, filed on May 4, 2017.

(51) Int. Cl.
*B60B 33/00* (2006.01)
*B62B 7/04* (2006.01)
*B62B 9/08* (2006.01)
*A47D 1/00* (2006.01)
*A47D 13/04* (2006.01)
(Continued)

(52) U.S. Cl.
CPC .......... *B60B 33/0097* (2013.01); *A47D 1/004* (2013.01); *A47D 13/043* (2013.01); *B60B 33/00* (2013.01); *B60B 33/0052* (2013.01); *B60B 33/0057* (2013.01); *B60B 33/0078* (2013.01); *B60B 33/0084* (2013.01); *B60B 33/0092* (2013.01); *B60B 33/021* (2013.01); *B62B 7/04* (2013.01); *B62B 9/082* (2013.01); *B62B 9/087* (2013.01); *B60B 33/0042* (2013.01); *B60B 2200/22* (2013.01); *B60B 2900/531* (2013.01); *B60Y 2200/81* (2013.01);
(Continued)

(58) Field of Classification Search
CPC . Y10T 16/195; Y10T 16/196; B60B 33/0094; B60B 33/0039; B60B 33/0049; B60B 33/0057; B60B 33/0068; B60B 33/0084; B60B 33/0092; B60B 33/025; B60B 33/021; B60B 33/0042; B60B 33/0078; B60B 33/0086; B60B 37/10; B60B 2200/222; B60B 2200/22; B60B 2200/242; B60B 2200/40; B60B 2900/531; B60B 2900/321; A61G 7/0528
See application file for complete search history.

(56) References Cited

U.S. PATENT DOCUMENTS 1,599,485 A 9/1926 Perin
4,114,232 A 9/1978 Umeda
(Continued)

FOREIGN PATENT DOCUMENTS

| CN | 101410287 A | | 4/2009 |
|---|---|---|---|
| JP | 02057403 A | * | 2/1990 |
| JP | 05310005 A | * | 11/1993 |

*Primary Examiner* — Chuck Y Mah
(74) *Attorney, Agent, or Firm* — Gardner Groff & Greenwald, PC (57) ABSTRACT

A swiveling caster wheel system for use on rolling devices such as children's accessories, furniture or equipment, and including a locking system having a locking actuator that is fixed in position regardless of the swivel position of the caster wheel. The system allows a user to access and actuate the caster locking system from a consistent position of the rolling device regardless of the swivel position of the caster wheel, and allows the caster wheel to be covered without blocking access to the locking actuator.

10 Claims, 6 Drawing Sheets

(51) Int. Cl.
  *B60B 33/02* (2006.01)
  *B62B 7/12* (2006.01)

(52) U.S. Cl.
  CPC ............ *B60Y 2200/83* (2013.01); *B62B 7/12* (2013.01); *B62B 2206/06* (2013.01); *B62B 2301/044* (2013.01)

(56) References Cited

U.S. PATENT DOCUMENTS

| | | | |
|---|---|---|---|
| 4,205,413 | A | 6/1980 | Collignon et al. |
| 4,248,445 | A | 2/1981 | Vassar |
| 4,276,962 | A | 7/1981 | Aulik |
| 4,360,951 | A | 11/1982 | Bucher |
| 4,677,706 | A | 7/1987 | Screen |
| 5,014,391 | A | 5/1991 | Schulte |
| 5,083,341 | A | 1/1992 | Milbredt et al. |
| 5,139,116 | A | 8/1992 | Screen |
| 5,232,071 | A | 8/1993 | Kawanabe |
| 5,303,450 | A | 4/1994 | Lange |
| 5,371,922 | A * | 12/1994 | Chern .................. A47D 13/04 16/35 R |
| 5,373,917 | A | 12/1994 | Kamman |
| 5,377,372 | A | 1/1995 | Rudolf et al. |
| 5,537,715 | A * | 7/1996 | Yang .................. B60B 33/0042 16/35 R |
| 5,774,936 | A | 7/1998 | Vetter |
| 5,829,096 | A | 11/1998 | Perry |
| 6,022,042 | A | 2/2000 | Hartenstine |
| 6,062,577 | A | 5/2000 | Tan |
| 6,219,881 | B1 | 4/2001 | Wen |
| 6,298,950 | B1 | 10/2001 | Oelrichs et al. |
| 6,336,524 | B1 | 1/2002 | Van Loon et al. |
| 6,443,468 | B1 | 9/2002 | Eros |
| 6,662,404 | B1 | 12/2003 | Stroh et al. |
| 6,834,746 | B1 | 12/2004 | Lin |
| 7,182,178 | B2 * | 2/2007 | Chung ................ B60B 33/0018 188/1.12 |
| 7,331,428 | B2 | 2/2008 | Chiang |
| 7,367,432 | B2 | 5/2008 | Chen |
| 7,537,093 | B2 | 5/2009 | Chen |
| 7,708,119 | B2 | 5/2010 | Chen |
| 7,987,553 | B2 * | 8/2011 | Lin ..................... B60B 33/0049 16/35 R |
| 8,117,715 | B2 * | 2/2012 | Tsai .................... B60B 33/0042 16/35 R |
| 8,205,297 | B2 | 6/2012 | Fallshaw et al. |
| 8,316,999 | B2 | 11/2012 | Solinski et al. |
| 8,376,374 | B2 | 2/2013 | Zhong et al. |
| 8,397,877 | B2 | 3/2013 | Mival et al. |
| 8,418,315 | B1 | 4/2013 | Lin et al. |
| 8,484,802 | B1 | 7/2013 | Lin et al. |
| 8,490,757 | B2 | 7/2013 | Chen et al. |
| 8,499,413 | B1 | 8/2013 | Tsai |
| 8,499,898 | B2 | 8/2013 | Thorne |
| 8,596,421 | B2 | 12/2013 | Park |
| 8,714,314 | B1 * | 5/2014 | Chen .................. B60B 33/0081 188/1.12 |
| 8,819,894 | B2 * | 9/2014 | Hamasaki ............ B60B 33/025 16/35 R |
| 8,844,096 | B2 | 9/2014 | Zhu |
| 8,850,657 | B1 * | 10/2014 | Yang ..................... B60B 33/021 16/35 R |
| 9,038,786 | B2 | 5/2015 | Lin |
| 9,139,043 | B1 | 9/2015 | Fan |
| 9,139,044 | B1 | 9/2015 | Tsai |
| 9,168,785 | B2 | 10/2015 | Spektor |
| 9,193,370 | B2 | 11/2015 | Henry |
| 9,266,393 | B2 | 2/2016 | Yeo |
| 9,481,206 | B2 | 11/2016 | Block et al. |
| 9,505,422 | B2 | 11/2016 | Leijdekkers et al. |
| 9,527,347 | B2 | 12/2016 | Spektor |
| 9,533,530 | B2 | 1/2017 | Hartenstine et al. |
| 2008/0073878 | A1 | 3/2008 | Li |
| 2008/0115324 | A1 * | 5/2008 | Block ................. B60B 33/0081 16/35 R |
| 2009/0113671 | A1 * | 5/2009 | Chu ................... B60B 33/0073 16/35 R |
| 2011/0119864 | A1 * | 5/2011 | Minowa ............. B60B 33/0049 16/45 |
| 2013/0174375 | A1 * | 7/2013 | Lin ....................... B60B 33/026 16/47 |
| 2013/0227817 | A1 * | 9/2013 | Block ................. B60B 33/0021 16/35 R |

* cited by examiner

BRAKING AND LOCKING SYSTEM FOR CASTER WHEELS

CROSS-REFERENCE TO RELATED APPLICATION

This application claims the benefit of U.S. Provisional Patent Application Ser. No. 62/501,166 filed May 4, 2017, the entirety of which is hereby incorporated herein by reference for all purposes.

TECHNICAL FIELD

The present invention relates generally to the field of wheeled transport, and more particularly to a braking or locking system for wheels or rollers, for example caster or swivel wheels, and to wheeled devices incorporating the same.

BACKGROUND

Various devices include wheels or rollers for ease of movement along a floor, the ground, or other support surfaces. For example, children's products such as entertainers, bouncers, high-chairs, cribs, swings, sleepers, rockers, car seats, and the like may be fitted with wheels to allow a parent or caregiver to roll the device to different locations within the home. Similarly, office chairs, tables, easels, file carts, medical carts, shopping carts, and other home or office furniture or equipment may include wheels for mobility and ease of repositioning by one or more persons pushing or pulling the device from one location or position to another. Typically, such products incorporate a wheeled base or frame having three or more wheels spaced about the periphery of device to provide a stable rolling structure. For example, many children's products incorporate a three or four-wheeled structure, and office chairs commonly incorporate a five or six-wheeled rolling base structure.

In many instances, one or more of the wheels or rollers of such rolling devices take the form of caster wheels, which are mounted to swivel or pivot relative to the device's base or frame structure, allowing the device to turn more easily as it is rolled, or to spin in place as a user repositions the device. For example, a wheeled children's entertainer may include four wheels, two of which are swiveling caster wheels and the other two of which are fixed axle straight-rolling wheels, allowing a user to steer the device as it is rolled; and office chairs may include all swiveling caster wheels allowing 360° rolling movement in any direction along a floor surface.

In some instances, it is desirable to provide for a user to selectively lock and unlock the wheels of a device, to prevent rolling or movement of the device when locked and allow rolling or movement when unlocked. For example, a children's high-chair may have one or more selectively lockable caster wheels so that a caregiver can freely reposition the chair to a desired position adjacent a dining table, and then lock the wheel(s) to prevent unintended movement away from the desired position as a result of movement of the child and/or an uneven floor surface. Lockable wheels may be particularly desirable where sloped floors or support surfaces may be encountered.

Typically, the locking mechanism of a locking caster wheel swivels with the wheel. This can result in user difficulty in accessing the locking actuator (typically a pedal or lever extending from one side of the caster) when it has swiveled around to a position beneath the wheeled device. For example, if the lockable caster wheels of a rolling cart pivot or swivel during movement into a position beneath the cart itself, the base or lower shelf of the cart may block user access to the locking actuator(s). This typically requires the user to roll the cart back-and-forth or in a circular motion to cause the casters to swivel back out from under the cart and thereby expose the locking actuator(s) for engagement of the locking mechanism. As a result, the device may be moved away from its desired position, and user displeasure can result from the additional time and effort required.

Accordingly, it can be seen that needs exist for improved braking and locking systems for wheels and wheeled devices, and in particular for swiveling caster wheels and devices incorporating the same. It is to the provision of improved systems, devices, wheels and casters meeting these and other needs that the present invention is primarily directed.

SUMMARY

The present invention provides improved braking and locking systems for wheels and wheeled devices, and in particular for swiveling caster wheels and devices incorporating the same. In example embodiments, the invention includes a locking system for a swiveling caster wheel having a locking actuator that is fixed in position regardless of the swivel position of the caster wheel. In this manner, a wheeled device incorporating one or more lockable swiveling caster wheels can be operated to lock and unlock the casters by a user accessing the locking actuator of each caster at a fixed and readily accessible location on the wheeled device, even if the casters have swiveled to a position underneath the device or otherwise difficult to access. In particular embodiments, the improved braking and locking systems of the invention allow a protective cover portion or shield to be incorporated into or onto the rolling device, to prevent or reduce the likelihood of injury from the caster (for example, pinching or rolling over injuries), while still allowing easy operation of the braking and locking mechanism from a fixed location outside of the protective cover and away from the caster wheel itself. In example embodiments, the invention further includes various wheeled devices incorporating one or more such braking and locking systems for swiveling caster wheels, including but not limited to children's products such as entertainers, bouncers, high-chairs, cribs, swings, sleepers, rockers, car seats, and the like; office chairs, tables, easels, file carts, medical carts, shopping carts, and/or other home or office furniture or equipment.

In one aspect, the present invention relates to a rolling device preferably including a base portion and at least one caster mounted to the base portion, the caster being configured to swivel about a vertical swivel axis to different swivel positions relative to the base portion, and having caster wheels configured to roll about a horizontal rolling axis generally orthogonal to the vertical swivel axis, whereby the rolling device may roll along a support surface. The rolling device preferably also includes a braking mechanism having a brake pin, an actuator operable by a user to selectively engage and disengage the braking mechanism, and an actuation flange extending about the vertical swivel axis of the caster and in operative engagement between the actuator and the brake pin. A first operation of the actuator preferably advances the actuation flange to engage the brake pin and prevent rolling of the caster wheels, and a second operation of the actuator preferably retracts the actuation flange to disengage the brake pin and allow rolling of the caster wheels. The actuator of the braking mechanism preferably remains fixed in position relative to the base portion regardless of the swivel position of the caster.

In another aspect, the invention relates to a locking caster wheel system including a caster wheel assembly and a locking assembly. The caster wheel assembly preferably includes a hub comprising a generally horizontal rolling axle opening and a generally vertical swivel axis sleeve, a rolling axle having a central portion coupled with the hub through the rolling axle opening, and first and second ends projecting outwardly from opposed sides of the hub defining a generally horizontal rolling axis. The caster wheel assembly preferably also includes first and second wheels affixed respectively to the first and second ends of the rolling axle whereby the wheels may spin rotationally relative to the hub, and at least one of the first and second wheels preferably further include a plurality of splines defining spaces therebetween. The caster wheel assembly preferably also includes a swivel pin coupled to the swivel axis sleeve of the hub, and defining a generally vertical swivel axis about which the caster wheel assembly may swivel through a range of swivel positions. The locking assembly preferably includes a locking pin, an actuator operable by a user to selectively engage and disengage the locking assembly, and an actuation flange extending about the generally vertical swivel axis of the caster wheel assembly and in operative engagement between the actuator and the locking pin. A first operation of the actuator preferably advances the actuation flange to engage the locking pin into one of the spaces between the splines and prevent rolling of the caster wheels, and a second operation of the actuator preferably retracts the actuation flange to disengage the locking pin from the space between the splines and allow rolling of the caster wheels.

In still another aspect, the invention relates to a children's entertainer device. The entertainer preferably includes a base, an upper support platform including a seat for supporting a child, a plurality of support posts supporting the upper support platform a distance above the base, and at least one locking caster wheel system coupled to the base. The at least one locking caster wheel system preferably includes at least one caster configured to swivel about a swivel axis to different swivel positions relative to the base, and preferably has one or more caster wheels configured to roll about a rolling axis. The entertainer preferably also includes a brake mechanism operable by a user to selectively engage to prevent rolling of the caster wheels and disengage to allow rolling of the caster wheels. The actuator of the brake mechanism preferably remains fixed in position relative to the base regardless of the swivel position of the caster.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-9 show various aspects, components and modes of use of a rolling wheeled device 10 in the example form of a children's mobile entertainer. In alternative embodiments, the rolling wheeled device of the present invention may take the form of other types of children's products such as entertainers, bouncers, high-chairs, cribs, swings, sleepers, rockers, car seats, and the like; office chairs, tables, easels, file carts, medical carts, shopping carts, and/or other home or office furniture or equipment. The wheeled device 10 comprises one or more, and preferably a plurality of, wheels or rollers—in the depicted embodiment comprising a pair of (two) fixed rolling wheels 12 and a pair of (two) swiveling caster wheels 14. In example embodiments, the device 10 includes a base platform 16 to which the wheels 12 and casters 14 are mounted, and a push-pull handle 18 for use by an adult caregiver in repositioning the device by rolling across a floor, the ground, or other support surface with which the wheels and casters are in contact. In the depicted embodiment, the device 10 further comprises an upper child support platform 20 supporting a seat or sling 22 for supporting a child, and a plurality (three are depicted) of support posts 24 configured to support the upper child support platform a distance above the base platform 16. Optionally, the support posts each comprise two or more telescopingly engaged segments allowing the height of the child support platform above the base platform 16 to be selectively adjusted. One or more toys or other accessories 26 are optionally provided around the seating area for entertainment and engagement of a child seated therein.

Figure 1:
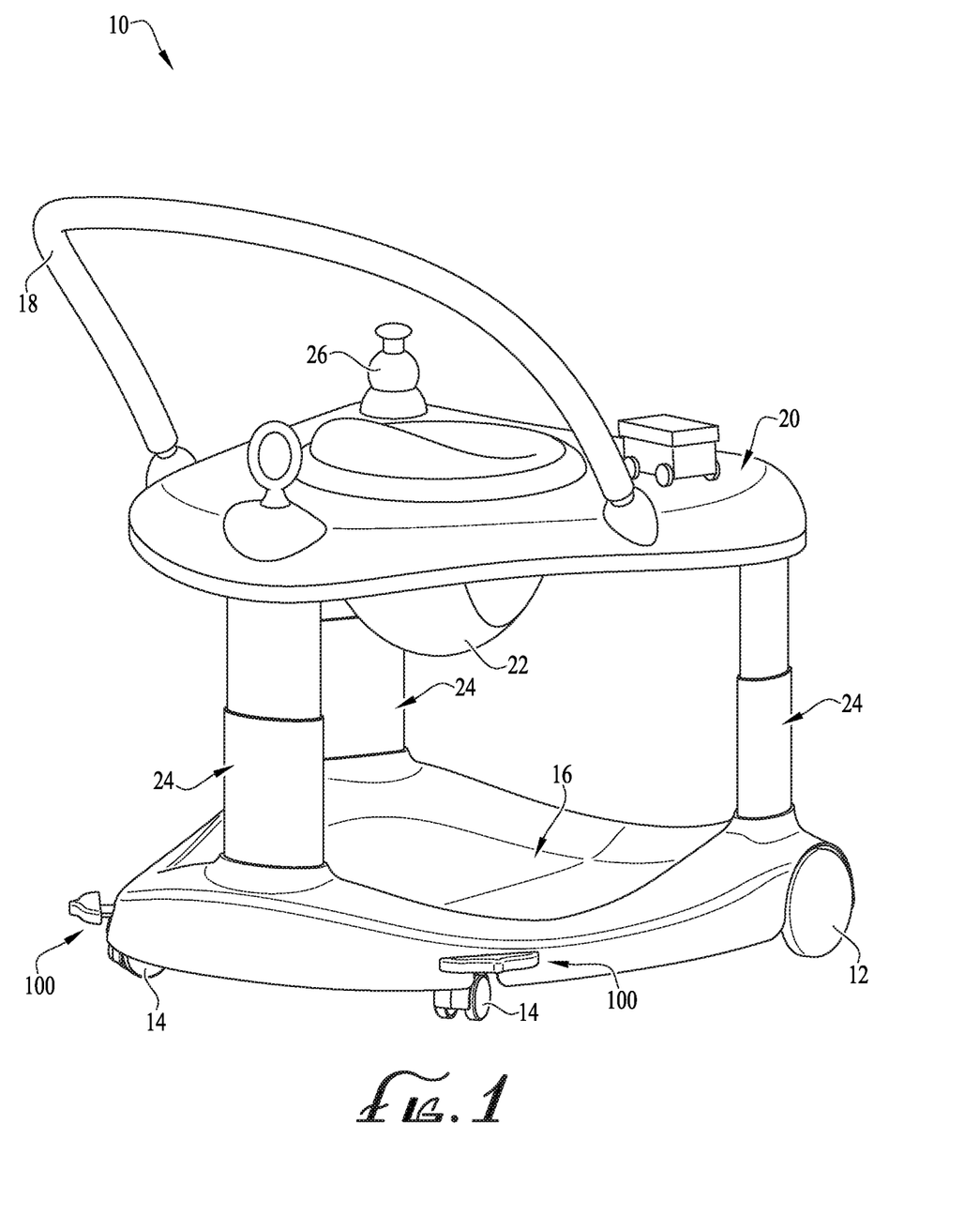
FIG. 1 is a perspective view of a rolling wheeled device in the form of a children's entertainer incorporating an improved caster wheel braking and locking system according to an example embodiment of the present invention.
Figure 2A:
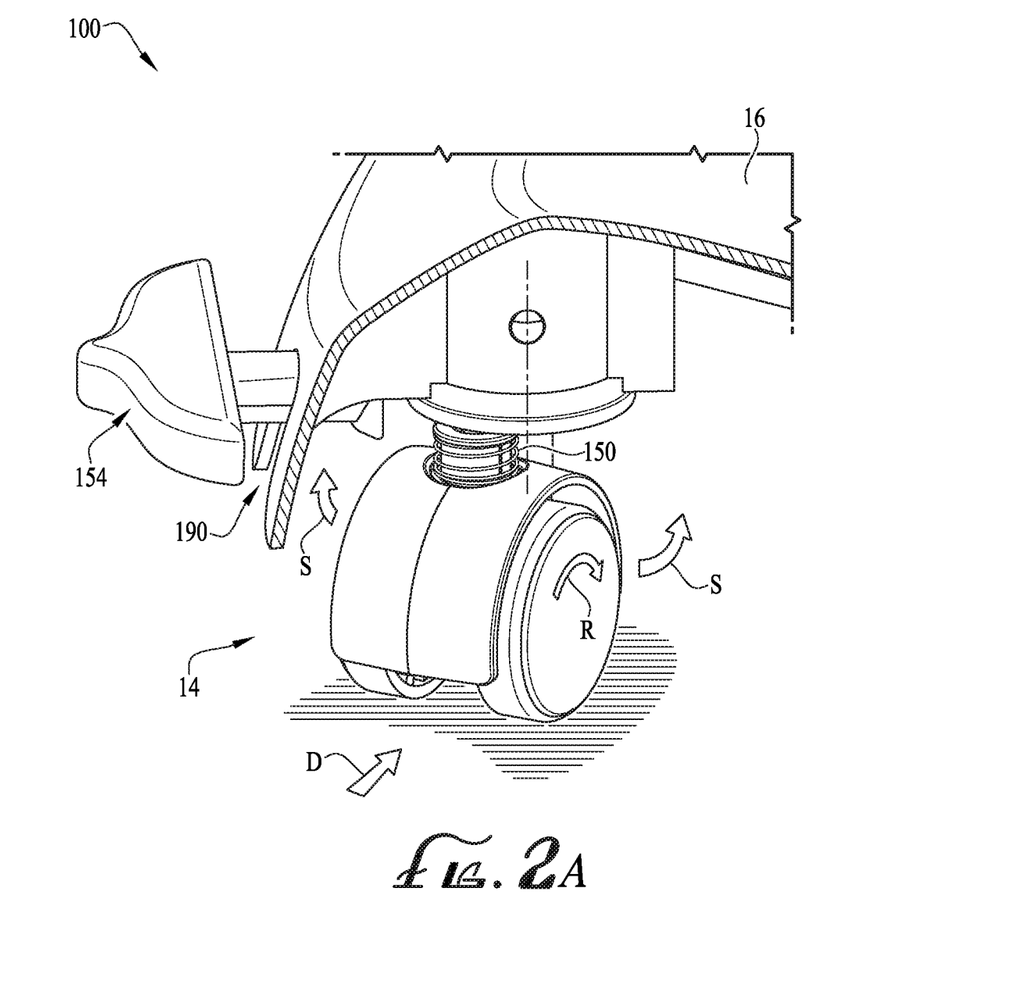
FIG. 2A is a perspective view of a caster wheel braking and locking system according to an example embodiment of the present invention, shown in an unlocked state and in a first rolling position and swivel orientation.
Figure 2B:
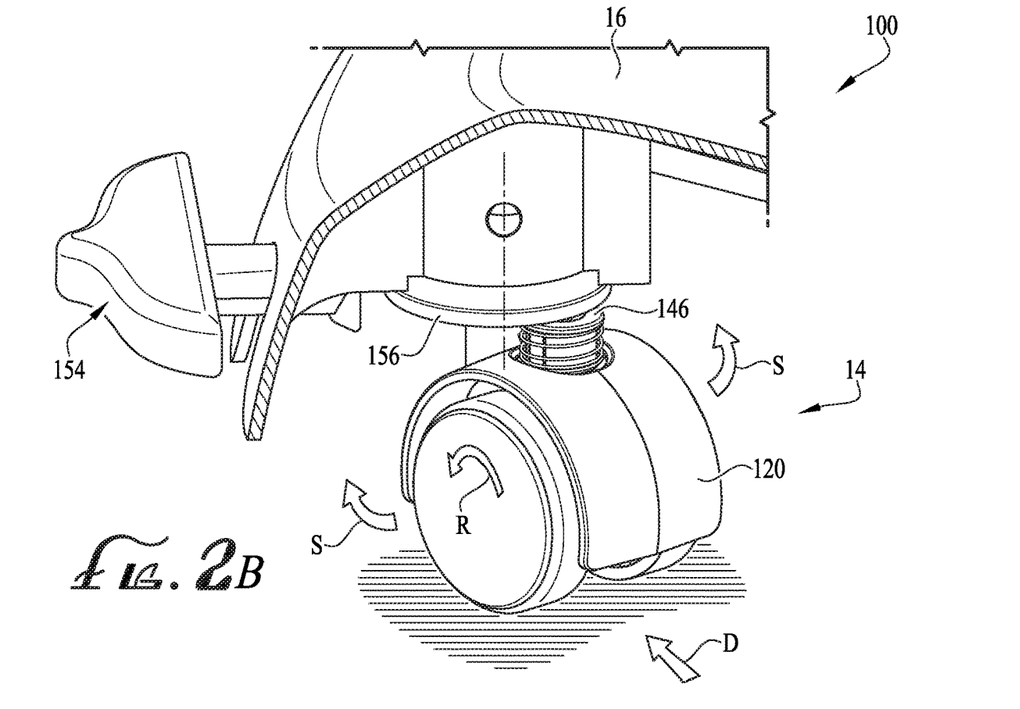
FIG. 2B is another perspective view of the caster wheel braking and locking system of FIG. 2A, shown in an unlocked state and in a second rolling position and swivel orientation offset from that shown in FIG. 2A.
Figure 2C:
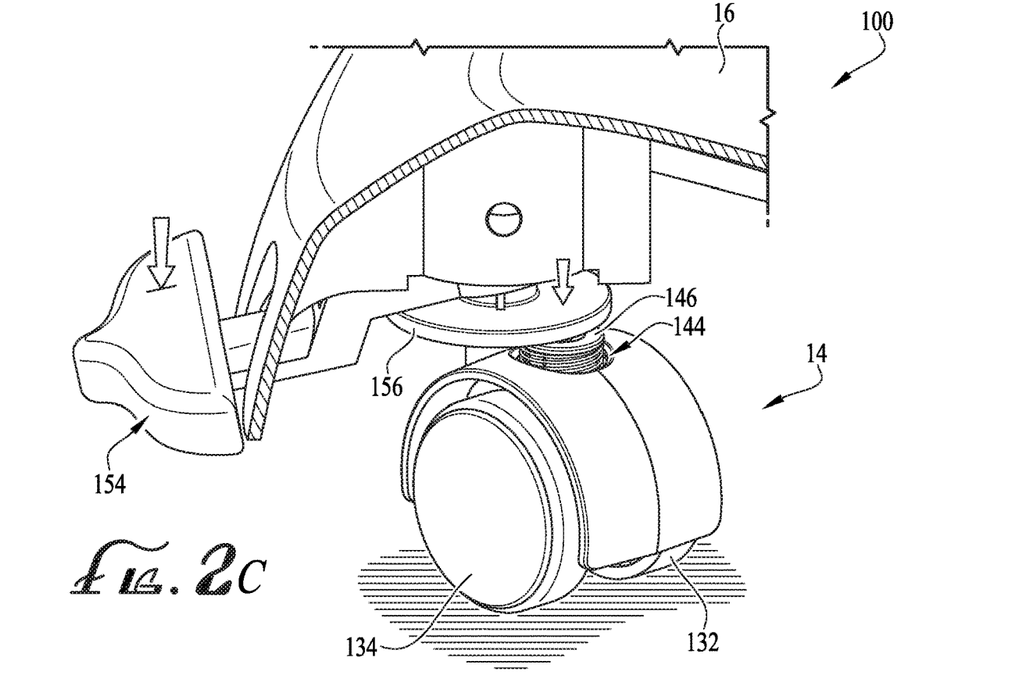
FIG. 2C is another perspective view of the caster wheel braking and locking system of FIG. 2A, shown in a locked or braking state.
Figure 3A:
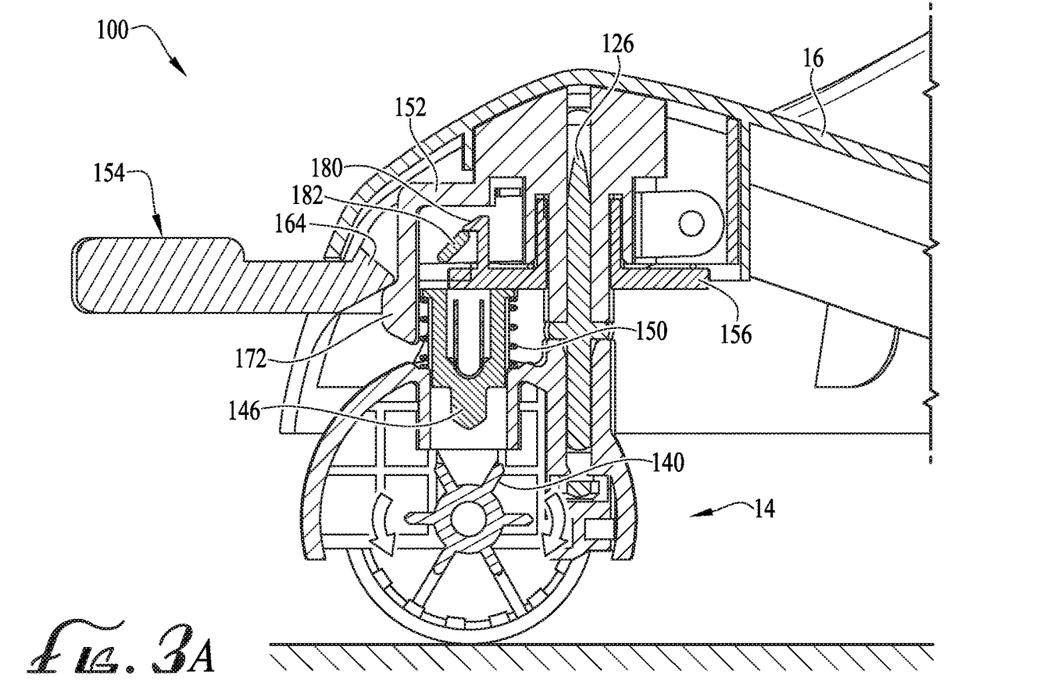
FIG. 3A is a cross-sectional view of the caster wheel braking and locking system of FIG. 2A, shown in the unlocked state.
Figure 3B:
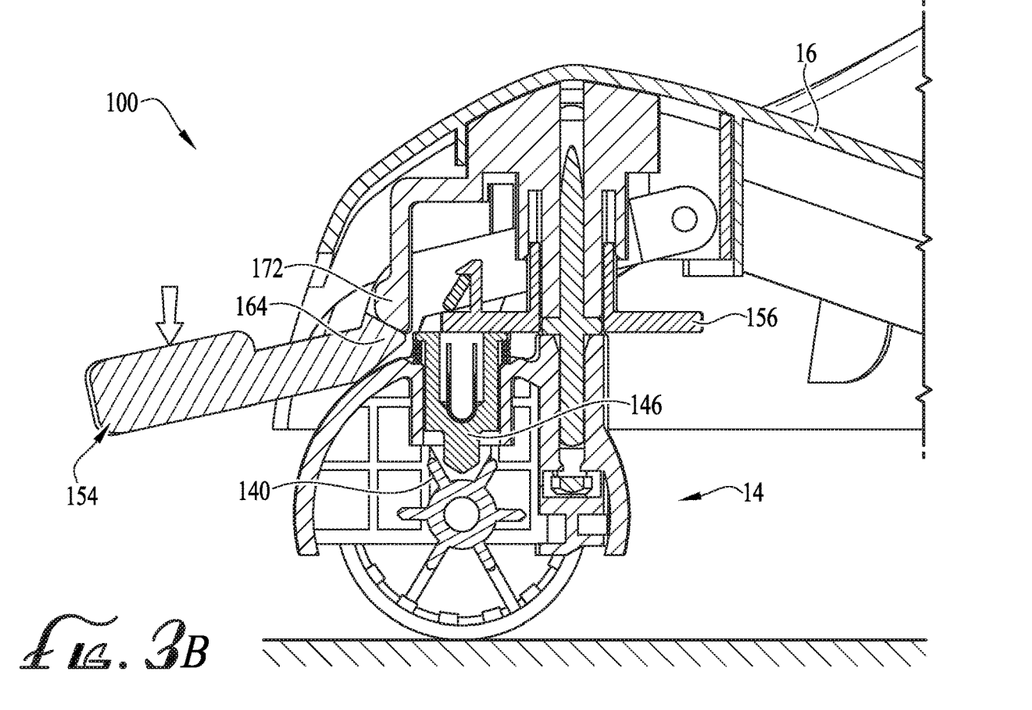
FIG. 3B is a cross-sectional view of the caster wheel braking and locking system of FIG. 3A, shown in the locked state.
Figure 4:
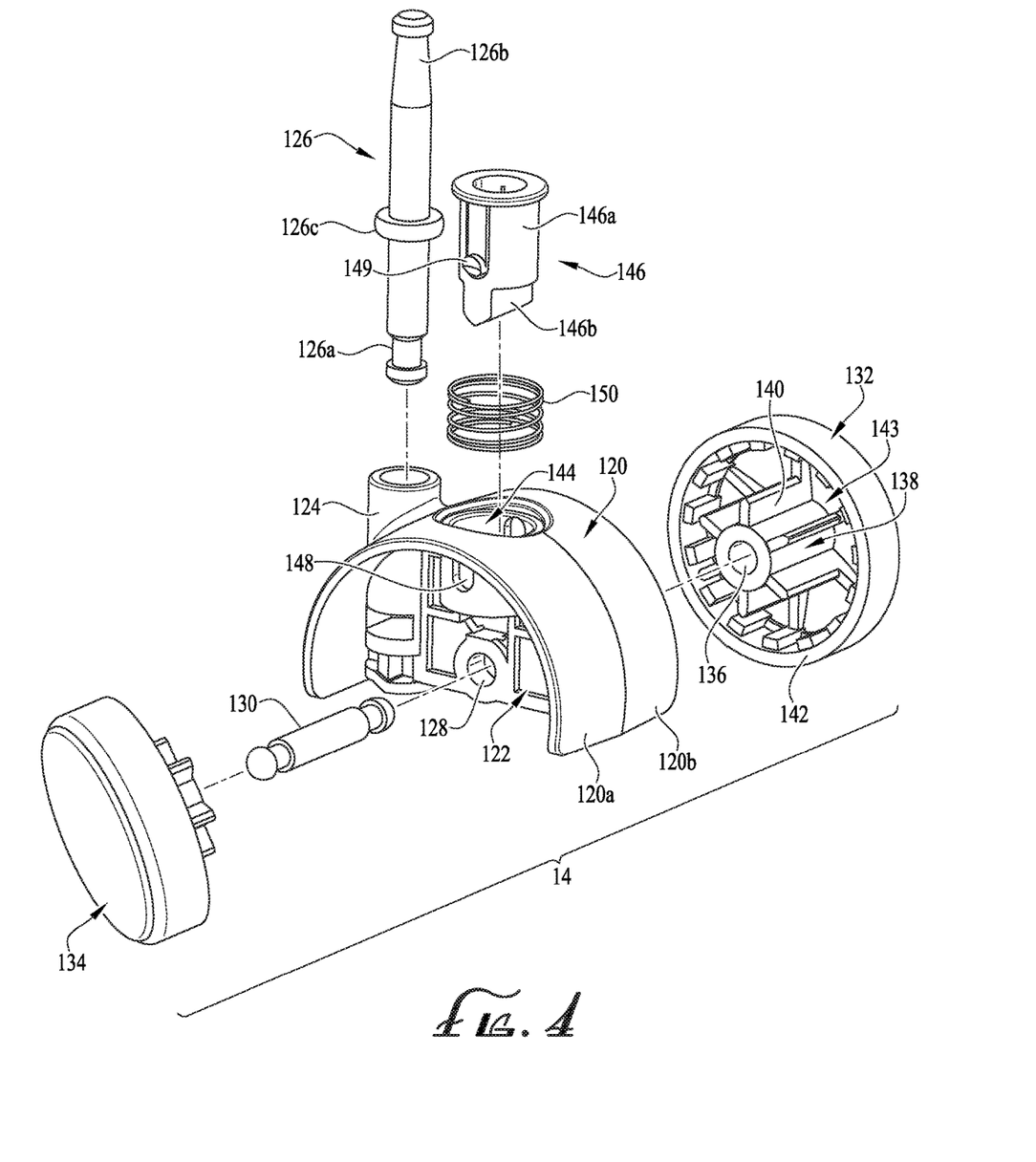
FIG. 4 is an assembly view of a caster wheel portion of the caster wheel braking and locking system of FIG. 2A.

FIGS. 2-5 show a braking and locking system 100 for a caster wheel 14, according to an example embodiment of the invention. With reference to FIG. 4, the caster 14 includes a cowling or wheel cover 120 made up of a first hub portion 120a and a second hub portion 120b coupled together to form a central hub 122. The central hub 122 includes a vertical sleeve 124 which extends partially below and partially above the wheel cover 120. The vertical sleeve 124 receives a vertical mounting pin 126 that may be used to secure the caster 14 to the braking assembly 100 or directly to the walker 10 or another child support device or rolling wheeled device. The vertical mounting pin 126 has a first or lower portion 126a configured to be received in and coupled to the vertical sleeve 124, a second or upper portion 126b configured to be received in and coupled to the base platform 16 proximal the braking assembly 100, and a transversely projecting collar 126c therebetween for maintaining the position of the caster 14 with respect to the braking assembly. The coupling of the vertical mounting pin 126 with the vertical sleeve 124 and with the base platform 16 optionally includes a bearing or rotational coupling and defines a vertical swivel axis about which the caster can swivel rotationally (see direction arrows S in FIGS. 2A and 2B) in a generally horizontal plane.

In example embodiments, the central hub 122 also includes a bearing or opening 128 that rotationally receives a horizontal rolling axle 130, which extends through the bearing, defining a horizontal rolling axis about which the caster wheel can roll (see direction arrows R in FIGS. 2A and 2B) as the device rolls horizontally in a direction of motion along the floor or other support surface (direction arrows D). A first and second wheel 132, 134 are mounted on the axle 130 via a center bore or receiver 136 in the first and second wheels. The wheels 132, 134 comprise a splined gear shaft or hub 138 surrounding the center bore 136 of the first wheel. A plurality of splines or spokes 140 extend radially outwardly from the gear shaft 138 toward the outer rim 142 of the wheel at evenly spaced circumferential intervals. The spaced radial placement of the splines 140 defines flared or outwardly tapered recesses 143 therebetween. The second wheel 134 is generally configured as a mirror image of the first wheel 132. In example embodiments, the horizontal rolling axis of the caster 14 is oriented generally perpendicular or orthogonal in three-dimensional projection to the vertical swivel axis of the caster, and the vertical swivel axis is optionally offset or skew at a distance transversely spaced from the horizontal rolling axis so that the caster pivots to follow the rolling direction of the rolling device 10 as it is moved by a user.

The central hub 122 further includes a socket 144 for receiving a brake pin 146. The socket 144 extends partially into the central hub 122, and the central hub defines transversely opposed slots 148 for receiving and slidingly engaging alignment fingers 149 on diametrically opposed sides of the brake pin 146 and coupling the brake pin to the socket via a snap-fit or other suitable connection. The brake pin 146 has a first, cylindrical portion 146a and a second, angular or wedge-shaped portion 146b for cooperating with the recesses 143 formed between the splines 140 on the gear shaft 138. A resilient member or spring 150 (e.g., a compression spring) surrounds the wedge-shaped portion 146b of the brake pin 146 to bias the brake pin upward and into the unlocked position (FIGS. 2A, 2B and 3A).

Figure 5:
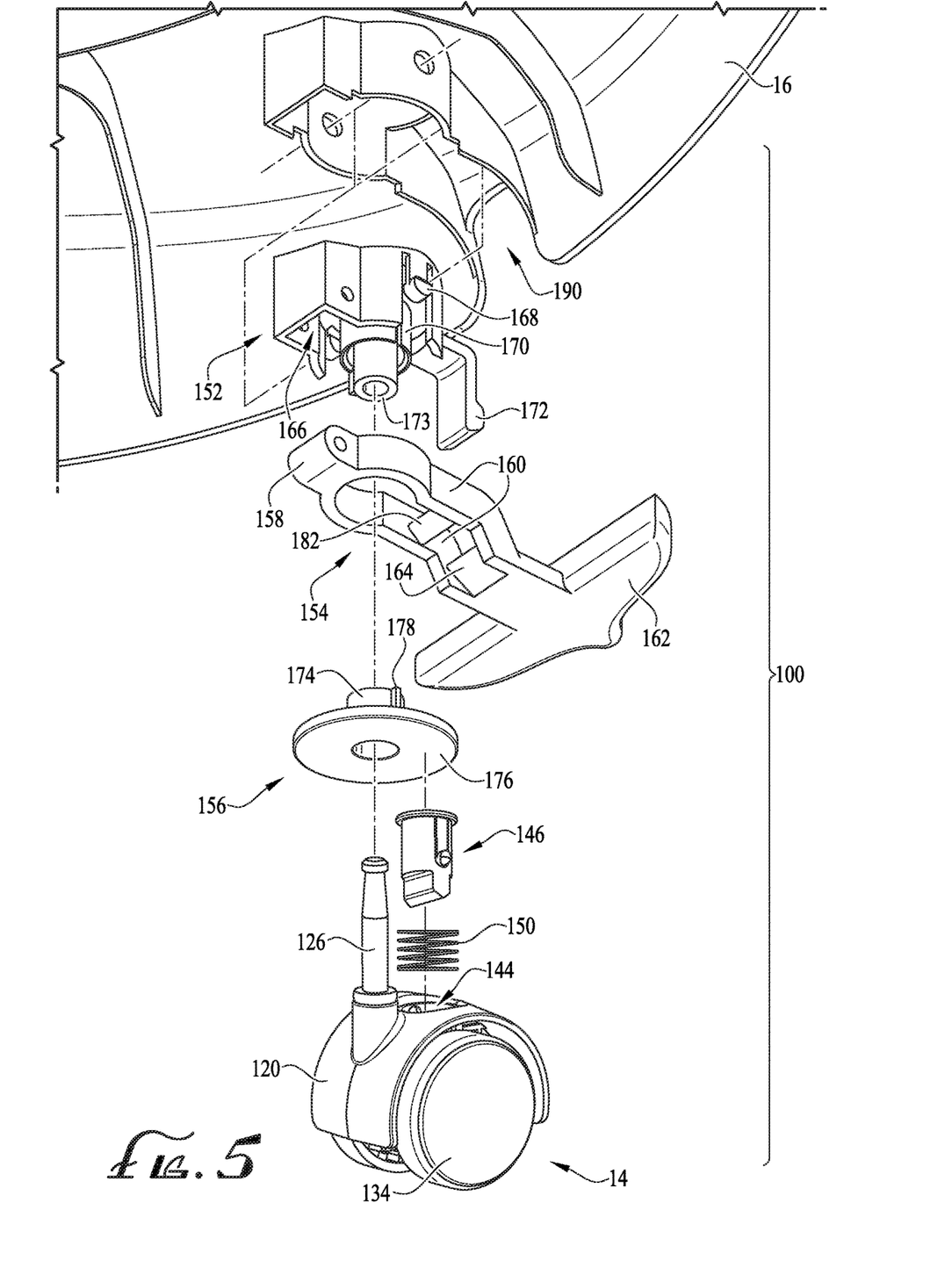
FIG. 5 is an assembly view of the caster wheel braking and locking system of FIG. 2A.

As shown in FIGS. 3A, 3B and 5, the braking assembly 100 further comprises a housing 152, an actuator or brake pedal 154, and a grommet-shaped disc plunger or actuation flange 156. The brake pedal 154 is located intermediate the housing 152 and the disc plunger 156. The brake pedal 154 includes a first portion 158 pivotally coupled to the housing 152, a pair of arms 160 extending from the first portion, and a pedal 162 extending from the pair of arms. A slanted or beveled engagement face portion 164 extends between the pair of arms 160. The housing 152 includes a first recess 166 for pivotally receiving and coupling to the brake pedal first portion 158, a snap-fit attachment mechanism 168 for coupling the braking assembly 100 to the base platform 16 of the walker 10, a disc-shaped sleeve 170 for slidably receiving the disc plunger 156, and a resilient latch 172 for cooperative engagement with the engagement face-portion 164 of the brake pedal 154 to retain the brake pedal 154 in a locked or unlocked position. The housing 152 further includes an elongated slot or collar 173 defining a receiver or bore for receiving the upper portion 126b of the mounting pin 126. The disc plunger or actuation flange 156 is a generally circular and substantially disc shaped member having an upwardly projecting cylindrical collar or neck 174 extending upward around the center of the outwardly projecting disc 176 for engagement and coupling within the housing sleeve 170. The disc plunger 156 optionally further includes an alignment fin 178 extending from the outer edge of the disc 176, and a resilient finger 180 having a tapered upper contact face and a generally horizontal lower abutment face for interaction with a cooperating engagement crossbar 182 extending between the arms 160 of the brake pedal 154. In example embodiments, the arms 160 of the brake pedal 154 have a width less than the diameter of the disc 176.

A method of operation for locking and unlocking the braking assembly 100 is shown in FIGS. 2 and 3. The braking assembly 100 is shown in the unlocked or brake-disengaged position in FIGS. 2A, 2B and 3A, wherein the caster 14 is free to rotate and/or swivel in any direction (as indicated by direction arrows R and S). In the unlocked position, the brake pin 146 is in the raised or disengaged position, being biased upward by the spring 150 and out of contact with the splines 140 of the caster wheel 132. In addition, the beveled lower face of the engagement portion 164 of the brake pedal 154 is engaged with a cooperating inclined upper abutment surface of the resilient latch 172 of the housing 152, thereby causing the disc plunger 156 to remain in the raised, unlocked position as shown in FIG. 3A.

When the actuation pedal 162 of the brake pedal 154 is pressed downward, the brake pedal pivots with respect to the housing 152, and the arms 160 of the brake pedal push down on the disc plunger 156, as shown in FIGS. 2C and 3B. As the disc plunger 156 moves downward, a bottom face of the disc 176 contacts the upper portion 146a of the brake pin 146, overcoming the force of the spring 150, thereby causing the lower, wedge-shaped portion 146b of the brake pin to slide into one of the recesses 143 between the flanges 140 of the gear shaft 138. When the brake pin 146 is engaged within one of the recesses 143 and between adjacent flanges 140, the wheels 132, 134 are no longer able to rotate and the caster 14 cannot swivel, due to interference between the brake pin and the flanges in this locked or brake-engaged position. The beveled upper face of the engagement portion 164 of the brake pedal 154 engages with a cooperating inclined lower abutment surface of the resilient latch 172 of the housing 152, thereby causing the disc plunger 156 to remain in the downward and locked braking position as shown in FIG. 3B.

Because the disc 176 of the plunger 156 is generally circular and extends circumferentially entirely around the vertical swivel axis defined by pin 126, the arms 160 of the brake pedal will contact the outwardly projecting disc of the plunger to actuate the brake mechanism 100 regardless of the swivel (S) position of the caster 14, and the brake pedal 162 does not swivel with the caster. Thus, the location on the rolling device 10 at which a user accesses the brake pedal 162 to actuate the brake mechanism 100 remains fixed relative to the base platform 16 of the rolling device, while the caster is free to swivel relative to the base platform (see FIGS. 2A, 2B and 2C). Also, because the disc 176 of the plunger 156 has a substantially constant diameter or radius and is symmetrically oriented around the vertical swivel axis, a substantially constant actuation force operates to lock and unlock the braking mechanism 100 regardless of the swivel position S of the caster 14.

To unlock the brake mechanism 100, the user lifts the brake pedal 154. Engagement of the engagement bar 182 of the brake pedal 154 against the lower abutment face of the finger 180 of the disc 176 raises the plunger 156 along with the brake pedal, allowing the brake pin 146 to retract upwardly out of engagement with the flanges 140 of the wheels 132, 134 under the biasing influence of the spring 150, and releasing the brake and allowing the caster wheels to roll freely.

Because the brake pedal 154 is accessible from a consistent location regardless of the swivel position of the caster 14, the rolling device 10 can include a protective hood or cover portion overlying at least a portion of, substantially all of, or all of the caster, to prevent injury from pinching between moving parts of the caster or rolling over a body part, and/or for aesthetic design purposes. For example, and as shown in the drawing figures, an outer or peripheral portion of the base platform 16 of the rolling device 10 can extend over and cover the caster 14. In example embodiments, an opening or slot 190 may be provided through the protective shroud or cover portion for passage of the arms 160 of the brake pedal 154, with the actuation pedal portion 162 extending through the opening or slot and externally of the protective shroud or cover portion for actuation by a user's hand or foot to engage and disengage the braking mechanism 100 and thereby lock or unlock the caster and prevent or allow rolling movement of device 10.

While the invention has been described with reference to example embodiments, it will be understood by those skilled in the art that a variety of modifications, additions and deletions are within the scope of the invention, as defined by the following claims.

What is claimed is:

1. A rolling device comprising:
a base portion;
at least one caster mounted to the base portion, the caster comprising splines defining recesses therebetween and the caster being configured to swivel about a vertical swivel axis to different swivel positions relative to the base portion, and having caster wheels configured to roll about a horizontal rolling axis generally orthogonal to the vertical swivel axis, whereby the rolling device may roll along a support surface; and
a braking mechanism comprising a housing, a brake pin, an actuator pivotally coupled to the housing and operable by a user to selectively engage and disengage the braking mechanism, and an actuation flange extending about the vertical swivel axis of the caster and in operative engagement between the actuator and the brake pin, whereby a first operation of the actuator advances the actuation flange to advance the brake pin into one of the recesses along a second vertical axis substantially parallel to the vertical swivel axis and prevent rolling of the caster wheels, and whereby a second operation of the actuator retracts the actuation flange to retract the brake pin from the one of the recesses along the second vertical axis and allow rolling of the caster wheels, wherein the actuator of the braking mechanism remains fixed in position relative to the base portion regardless of the swivel position of the caster.

2. The rolling device of claim 1, wherein the caster comprises a cover having a socket defined therein, through which a portion of the brake pin passes to engage and prevent rolling of the caster wheels.

3. The rolling device of claim 1, wherein the braking mechanism further comprises a spring biasing the brake pin toward its disengaged position.

4. The rolling device of claim 1, wherein the braking mechanism further comprises a latching mechanism to retain the brake mechanism in its engaged and disengaged positions.

5. The rolling device of claim 1, wherein the actuation flange comprises a generally circular disc having a central opening through which the vertical swivel axis of the caster extends.

6. The rolling device of claim 1, wherein the base portion at least partially covers the at least one caster.

7. The rolling device of claim 6, wherein the actuator of the braking mechanism extends through a slot in the base portion.

8. The rolling device of claim 1, wherein the actuator of the braking mechanism comprises a brake pedal which a user depresses to advance the actuation flange to advance the brake pin and prevent rolling of the caster wheels, and which the user raises to retract the actuation flange to retract the brake pin and allow rolling of the caster wheels.

9. The rolling device of claim 1, wherein the rolling device comprises a children's product selected from an entertainer, a bouncer, a high-chair, a crib, a swing, a sleeper, a rocker, or a car seat.

10. The rolling device of claim 1, wherein the rolling device comprises home or office furniture or equipment selected from an office chair, a table, an easel, a file cart, a medical cart, or a shopping cart.

* * * * *